Inventor
Uno T. Hill
By Hibben, Noyes & Bicknell
Attorneys

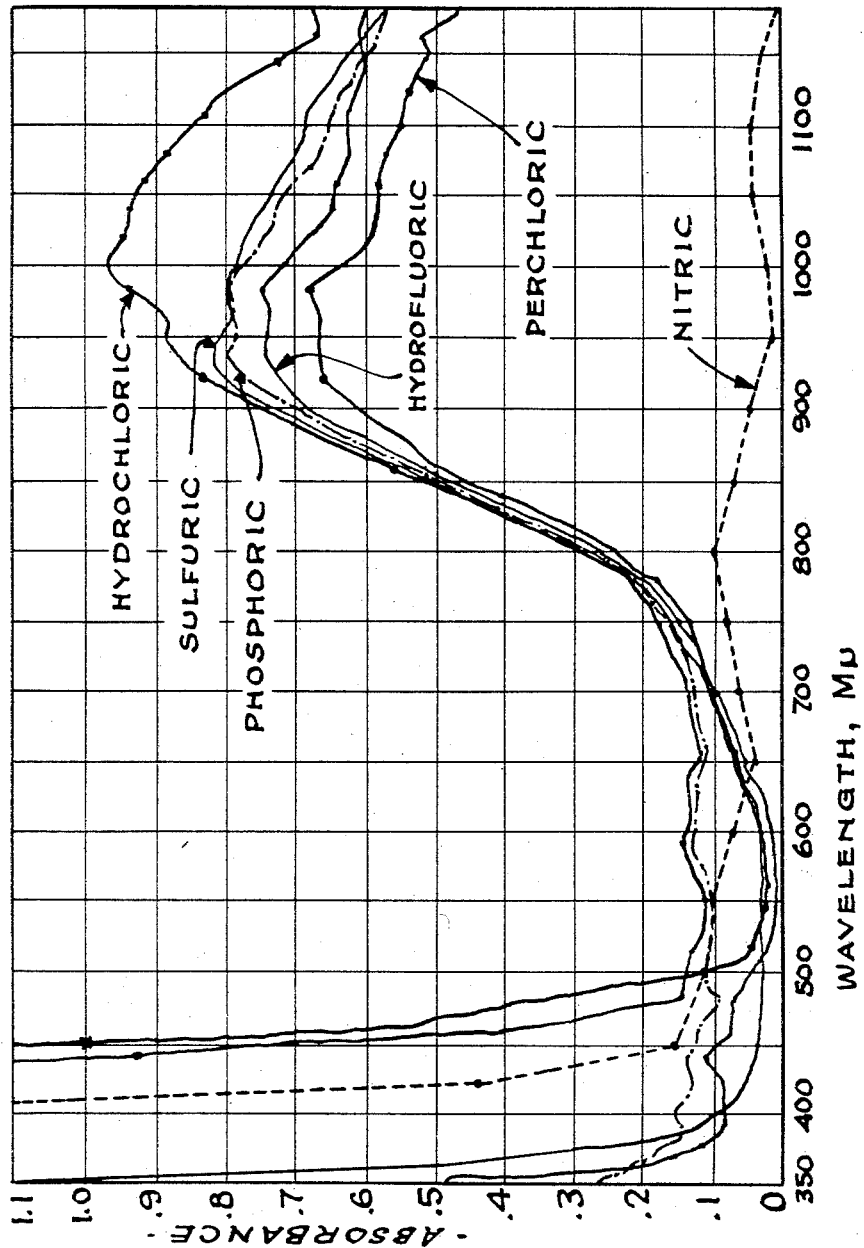

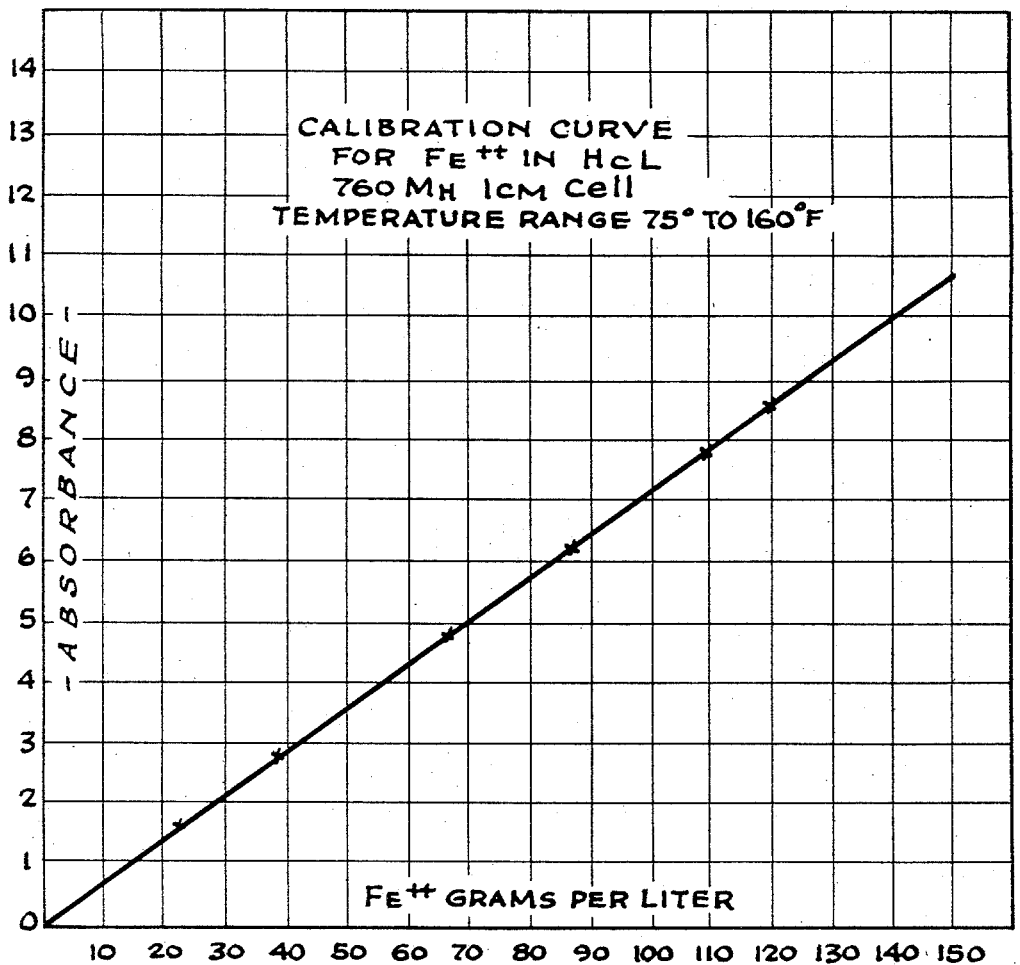

United States Patent Office 3,427,198
Patented Feb. 11, 1969

3,427,198
METHOD AND APPARATUS FOR AUTOMATIC CONTROL OF PICKLING SYSTEM
Uno T. Hill, Gary, Ind., assignor to Inland Steel Company, Chicago, Ill., a corporation of Delaware
Continuation-in-part of abandoned application Ser. No. 218,786, Aug. 22, 1962. This application Oct. 22, 1965, Ser. No. 502,105
U.S. Cl. 134—10                                    12 Claims
Int. Cl. C23g 1/08, 3/00; G01n 21/02

This application is a continuation-in-part of my copending U.S. application Ser. No. 218,786, filed Aug. 22, 1962, now abandoned.

This invention relates generally to improvements in the pickling of metal, and more particlarly to improvements in the control of acid and ferrous iron concentrations in a ferrous metal acid pickling process. In my Patent No. 3,074,277, a control scheme for a sulfuric acid pickling process is described which is based on the concept of independently measuring the specific gravity and the ferrous sulfate content of the pickle liquor, and combining the resultant signals or measurements so as to correct the specific gravity determination for the contribution to specific gravity made by the ferrous sulfate. As a result, a net measurement or signal is obtained which is a measure of acid concentration and can be used to control the addition of makeup acid.

Although the foregoing method based on combining independent measurements of specific gravity and ferrous sulfate concentration is entirely practical and gives excellent results in commercial practice, I found that it is in some instances advantageous to obtain the desired control of acid concentration by a simplified method and apparatus, as described in my copending application Ser. No. 218,786, which does not require the costly instrumentation for combining the specific gravity and ferrous sulfate concentration signals used in my Patent No. 3,074,277 and which employs means for controlling the ferrous sulfate concentration in the pickling bath. Continued investigation has lead to the discovery that the concentration of other acids and salts in addition to sulfuric acid and ferrous sulfate can be measured and controlled by the system disclosed in application Ser. No. 218,786.

It is therefore an object of the present invention to provide a novel and simplified means of automatically continuously controlling the acid and metal ion concentrations of a metal acid pickling bath.

A further object of the invention is to provide a novel and improved system for determining the concentration of acid and ferrous ion concentration of a pickling bath which does not require combining of independent measurements of specific gravity and iron salt concentration in the pickling bath.

Still another object of the invention is to provide an improved control system for regulating the concentration of pickling acid and ferrous salt of a ferrous metal pickling bath.

An additional object of the invention is to provide a novel and improved means for overcoming difficulties in an acid pickle liquor control system caused by the presence of hydrogen or other dissolved gas in the pickle liquor.

Other objects and advantages of the invention will become evident from the subsequent detailed description taken in conjunction with the accompanying drawing, wherein:

FIG. 3 is a graph showing the absorption curves of a number of pickling acids in aqueous solution at various light wave lengths; and FIG. 4 is a graph showing the absorption of hydrochloric specific acid plotted against the concentration of the acid in a pickling solution.

Figure 1:
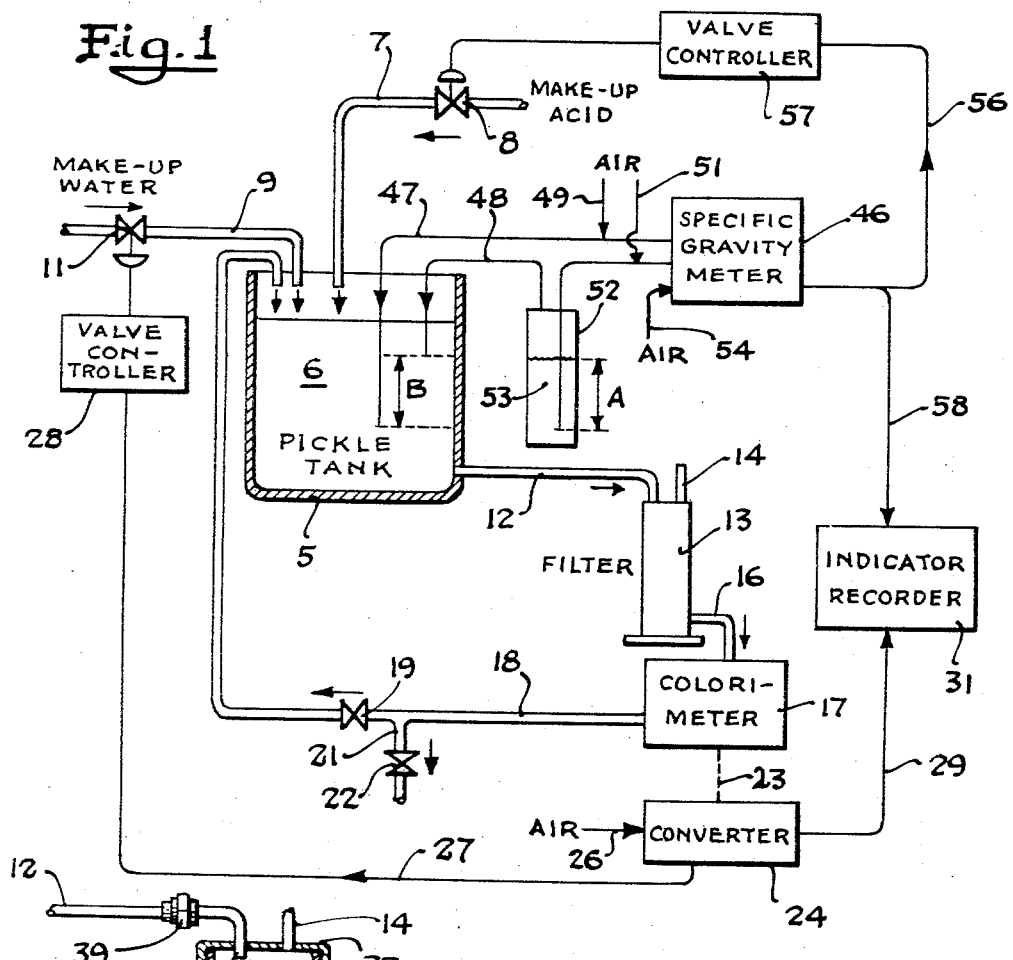
FIG. 1 is a schematic diagram illustrating one specific embodiment of the control arrangement of the present invention.

In FIG. 1, a pickle tank 5 is shown containing a pickling acid bath 6 and having a conduit 7 with a flow control valve 8 for adding fresh acid and a conduit 9 with a flow control valve 11 for adding water. It will be understood that in an actual pickling system a plurality of such tanks may be employed and that fresh acid may be controllably added to more than one tank, if desired. In FIG. 1 the various control instruments are illustrated in schematic or block form since they constitute well known mechanisms, the details of which form no particular part of the present invention. The conduits or pipes for passage of acid, water, and pickle liquor are designated by double lines in FIG. 1, whereas single lines are employed to illustrate air tubes or pipes communicating with the various instruments.

In my aforementioned Patent No. 3,074,277 it was pointed out that the specific gravity of the pickle liquor is an additive function of the acid concentration and the ferrous sulfate concentration of the liquor. Consequently, acid concentration is readily determinable by mathematically combining independent measurements of specific gravity and ferrous sulfate concentration. In other words, the specific gravity determination is "corrected" by an amount corresponding to the contribution made to the specific gravity by the ferrous sulfate, and the resultant "corrected" specific gravity is a measurement of acid concentration which can be used for control purposes to regulate the addition of makeup acid. However, it will be appreciated that if the correction for ferrous sulfate concentration could be maintained at a known constant value, then the specific gravity measurement could be used directly for the control of makeup acid addition without the necessity for complicated and costly signal-combining instruments. Accordingly, the ferrous sulfate concentration of the bath 6 is maintained substantially constant by the regulated addition of water through the conduit 9, and the measurement of the specific gravity of the bath 6 can then be used to regulate the addition of makeup acid through the conduit 7.

In determining of a metal ion concentration and particularly a ferrous ion concentration of a pickle liquor, a photometric technique has been found particularly satisfactory. By passage of a beam of light of suitable wave length, preferably in the near infrared or infrared region, through a cell containing a pickle liquor sample, the intensity of the transmitted or unabsorbed light is a measure of the metal ion concentration of the sample. The use of a filter transmitting light in the infrared wave length region of from about 750 to about 1330 millimicrons has been found satisfactory, and particularly from about 940 to about 1100 millimicrons where maximum sensitivity is desired for determining the iron ion concentration in the pickling acids. Various colorimetric or spectrophotometric devices are well known for use with a continuously flowing stream of liquid. The industrial flow colorimeter manufactured by Beckman Instruments, Inc., is a typical device which may be used with good results in the control system of the present invention. If desired, a split or double beam colorimeter can be used.

As is well known in the operation of colorimeter devices, the sample liquid is passed through an absorption cell having transparent walls and arranged to provide a light path of predetermined length. The absorption cell is usually made of suitable glass but can also be made of a plastic material, such as Plexiglas. A Plexiglas cell has the advantage of being resistant to hydrofluoric acid and is also self-cleaning. A constant voltage light source is employed with a suitable filter to obtain a beam of light of the desired wave length, such as 760 millimicrons, where the ferrous ion concentration is to be determined, which is passed through the sample liquid in the absorption cell. The unabsorbed or transmitted light is received by a photoelectric cell, and a suitable electrical output signal is transmitted which is a measure of the iron ion concentration in the sample of liquid.

It has been found that the concentration of a metal ion, particularly ferrous ions, can be readily determined photometrically in various pickling acid baths in addition to sulfuric acid baths, in accordance with the foregoing procedure. Thus, the pickling acids, such as hydrochloric, hydrofluoric, phosphoric, and perchloric acids, which form substantially colorless ferrous salts in aqueous solution were all unexpectedly found to exhibit a similar and characteristic absorption spectrum when exposed to light, preferably between about 750 and about 1100 millimicrons (see FIG. 3). The applicability of the Beer-Lambert law to ferrous ion concentration in a hydrochloric acid pickling bath is evident from the straight line graph of FIG. 4 of the drawing. The ferric ion concentration in nitric acid can also be colorimetrically determined, although the absorption curve in the infrared region is less distinct.

Reverting to FIG. 1, it is desirable for best results that a continuous sample stream of pickle liquor be withdrawn from the bath 6 and passed through the absorption cell of the colorimeter. In accordance with well known practice, a suitable filter or baffling arrangement should be employed to insure the withdrawal of a sample stream which is free of suspended particles. However, I have also found that acid pickle liquor frequently contains dissolved hydrogen and that this leads to erratic results in connection with measurement of metal ion content and specific gravity. When these measurements are to be used for control purposes, such fluctuations are particularly troublesome. In accordance with the present invention, a filter unit is utilized which not only removes suspended solid particles but also effects separation of hydrogen or other dissolved gases from the sample. The filter unit can be disposed about the inlet end of the line withdrawing the sample from the pickle bath and/or disposed at the outlet end of the sample line.

As shown in FIG. 1, a sample stream is withdrawn from the tank 5 through a line 12 and is passed downwardly through a filter unit 13. Separated gas is vented from the filter 13 through an outlet 14, as hereinafter described. The filtered stream passes from the bottom of the filter unit 13 through a line 16 into a line 18 having a valve 19. In some instances the effluent sample stream from the colorimeter 17 may be discarded, as through a branch line 21 having a valve 22, rather than being recirculated to the pickle tank 5. The electrical output signal from the photoelectric circuit of the colorimeter 17 is transmitted, as indicated by the dotted line 23, to a potentiometric device 24 or the like capable of converting the electrical signal to an equivalent pneumatic signal. The electrical output signal of the colorimeter 17 is nonlinear and varies in a substantially logarithmic manner with changes in ferrous ion content. Dependent upon the type of control equipment employed, it may be desirable that the signal from the colorimeter 17 be linearized. This is readily accomplished in a well known manner by means of a suitable cam in the potentiometric device 24 which is preferably a null balance potentiometer. Supply air is directed to the instrument 24 through a line 26 and the resultant linearized pneumatic signal is transmitted through a line 27 to a valve positioner or control device 28 which is connected to the diaphragm of the control valve 11. By suitable setting of the control instrument 28, it will be understood that the addition of water to the tank 5 is regulated in accordance with the ferrous ion measurement of the colorimeter 17 so as to maintain the ferrous ion content of the bath 6 substantially constant. The measurement of ferrous ion concentration by the colorimeter 17 may also be transmitted by a line 29 from the converter 24 to an indicator-recorder 31.

Figure 2:
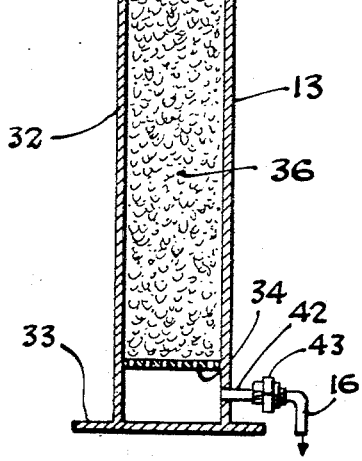
FIG. 2 is an enlarged sectional view of a gas separator and filter means constituting one element of the system shown in FIG. 1.

In FIG. 2, the filter unit 13 is shown in detail and comprises an upright cylinder or shell 32 having a base 33. A pair of plastic screens or perforated plates 34 are fixed in the cylinder 32 and are spaced inwardly from the ends of the cylinder. The space between the plates 34 is filled with a suitable acid resistant filter material 36 such as glass wool. The upper end of the cylinder 32 is threaded for detachably receiving a threaded cap 37 which carries the gas vent 14 and an inlet stub 38 having a detachable connection 39 with the sample conduit 12. Thus, as the inlet sample liquor enters the space 41 in the cylinder 32 above the upper plate 34, hydrogen or other dissolved gas readily disengages from the liquor and escapes through the vent 14. At the lower end of the cylinder 32 below the lower plate 34 an outlet stub 42 is provided having a detachable connection 43 with the line 16. By means of the detachable connections 39 and 43, the filter unit 13 can easily be removed when the filter medium 36 requires replacement or purging.

Although various instruments of well known types may be employed for specific gravity measurement, such as a flow through density transmitter manufactured by the Minneapolis-Honeywell Instrument Company of Philadelphia, Pa., a differential pressure type transmitter is shown for purposes of illustrating the present invention. In a device of this type the pressure exerted by a column of reference liquid is balanced against the pressure of an equal head of the pickle liquor and the resultant differential pressure is transmitted to a receiver element such as a flexible diaphragm. One commercially available instrument of this type is the so-called "differential converter specific gravity transmitter" manufactured by the Minneapolis-Honeywell Company. In this particular instrument the force of the measured differential pressure is opposed by air pressure acting on a pivoted beam. The air pressure which is developed to balance the differential pressure thereby becomes a measure of the differential presssure or specific gravity and transmits a suitable pneumatic signal.

The illustrated means of obtaining a differential pressure measurement in the pickle liquor bath involves the use of a pair of dip tubes immersed in the bath and terminating at different distances below the surface of the bath. Air under pressure is passed through the dip tubes at a low rate of flow sufficient to prevent the liquor from entering the dip tubes. The tubes are connected to the differential pressure measuring instrument, and any variation in the specific gravity of the pickle liquor is reflected by a change in differential pressure inasmuch as the depths of the respective tubes are constant. In order to increase the range of the instrument, it is desirable to interpose a reference liquid chamber in one of the dip tube lines, the height of the column of reference liquid being equal to the difference between the immersion depths of the two dip tubes in the pickle liquor bath. Inasmuch as the difference between the immersion depths of the dip tubes is constant or fixed, it will be understood that any variation in the liquid level of the tank will not affect the differential pressure or specific gravity measurement.

In FIG. 1 the specific gravity measuring instrument is designated at 46, and a pair of dip tubes 47 and 48 extend into the pickle liquor bath 6 and terminate at different distances below the surface of the bath. Air under constant pressure is supplied through lines 49 and 51 to the dip tubes 47 and 48, respectively, and is bubbled into the bath 6 at a rate sufficient to purge the dip tubes and prevent entry of liquid, the back pressure from the dip tubes being transmitted to the instrument 46. As heretofore mentioned, in order to secure a range on the instrument chart or scale, a vessel 52 containing a reference liquid 53 is interposed in the dip tube 48 to provide a predetermined "suppression" of the pressure in the tube 48. The effective head of the reference liquid 53 (designated at A) is selected so as to be equal to the difference (designated at B) between the immersion depths of the dip tubes 47 and 48. Therefore, by selecting a reference liquid with a specific gravity equal to the lowest specific gravity value expected in the pickle liquor bath 6, a relatively wide range of specific gravity measurements is possible. Since the distance B is fixed, any variation in the level of the surface of the bath 6 will have an equal effect on both dip tubes 47 and 48 and the differential pressure measurement will remain unchanged.

Consequently, any change in specific gravity of the pickle liquor 6 will be reflected in a change in differential pressure and a corresponding change in output signal will be transmitted by the instrument 46. Although any suitable type of output signal, such as an electronic signal, can be utilized, the invention as illustrated employs a pneumatic output signal. Thus, an air supply line 54 connects with the instrument 46 and the output pneumatic signal is transmitted through an air line 56 to a valve positioner or control device 57 connected to the control valve 8. A branch line 58 communicates with the indicator-recorder 31 and is preferably used for providing a permanent continuous record of the specific gravity of the pickle liquor. By suitable setting the control instrument 57, the control valve 8 can be operated in accordance with the specific gravity determinations made by the instrument 46 so as to maintain the acid content of the bath 6 within predetermined limits by adding suitable amounts of fresh acid through the conduit 7. Inasmuch as the ferrous ion content of the bath 6 is maintained substantially constant and thus at a predetermined known value of any given time by the regulated addition of water in the manner heretofore described, any variation in specific gravity of the bath 6 is directly attributable to variations in the mineral acid content, and consequently the specific gravity meter 46 is directly usable for controlling the addition of fresh acid without compensation or correction of the signal.

Since dissolved hydrogen or other gas also interferes on occasion with the specific gravity measurement, it may also be advantageous to employ a filter unit, such as the unit 13, in conjunction with the specific gravity meter 46. In such case the dip tubes 47 and 48 extend into a separate sample container or vessel (not shown) which is fed with pickle liquor from the tank 5, the filter unit being interposed in an obvious manner in the line between the tank 5 and the sample container. Alternatively, the effluent sample liquor removed from the colorimeter 17 through the line 18 could be supplied directly to the sample container for the dip tubes, in which event the filter unit 13 shown in FIG. 1 would supply a filtered gas-free sample for both the colorimetric determination of the ferrous salt concentration, such as ferrous sulfate, and the specific gravity determination.

While sulfuric acid and hydrochloric acid are most commonly used for pickling low carbon steel strips, such as black plate, it should be understood that in pickling other metals, such as stainless steel or other alloy steels or high carbon steels, it is generally advisable to use other acids or combination of acids. For example, in pickling stainless steel, a mixture of sulfuric acid with another mineral acid, such as hydrochloric, hydrofluoric, nitric or phosphoric acid, is usually employed. The process of the present invention can also be used for controlling the acid and metal concentrations in the latter pickling baths.

Although the invention has been described with reference to a particular embodiment thereof, it is to be understood that various modifications and alternatives may be resorted to without departing from the scope of the invention as defined in the appended claims.

I claim:
1. In a process of treating a metal by contact with an aqueous mineral acid bath wherein acid is consumed by conversion to an ionized metal salt and wherein water and concentrated makeup acid are added to said bath, the improved method of control which comprises; withdrawing from said bath a sample stream, exposing said stream to light in a colorimeter and obtaining a first signal which is a measure of the concentration of ions of said metal in said bath, regulating the addition of water to said bath in response to said first signal to maintain the concentration of said ions in said bath substantially constant, measuring the specific gravity of said stream and obtaining a second signal which is a direct measure of the acid concentration of said bath, and regulating the addition of concentrated makeup acid to said bath in response to said second signal to maintain said acid concentration of said bath within predetermined limits.

2. In a process of pickling a metal by contacting with an aqueous bath of a metal pickling acid wherein said acid is consumed by conversion to an ionized metal salt and wherein water and concentrated makeup metal pickling acid are added to said bath during said process to maintain said acid and salt at predetermined concentrations, the improved method of controlling the said acid and metal salt concentration of said bath which comprises; continuously withdrawing a sample stream of said bath containing a said metal pickling acid and said ionized metal salt, measuring continuously by photometric means the concentration of said metal ion of said sample stream and obtaining a first signal which is a measure of the metal salt concentration of said bath, feeding said first signal to a water flow control means for regulating the addition of water to said bath to maintain continuously said metal salt at a predetermined concentration, continuously measuring the specific gravity of said stream containing said predetermined concentration of said metal salt and obtaining a second signal which is a measure of the acid concentration of said bath, feeding said second signal to an acid flow valve means, and continuously regulating the addition of concentrated makeup acid to said bath in response to said second signal and thereby continuously maintaining said acid concentration of said solution within predetermined limits.

3. In the pickling of a ferrous metal by contact with an aqueous sulfuric acid pickling bath wherein said acid is consumed by conversion to ferrous sulfate and wherein water and concentrated makeup sulfuric acid are added to said solution, the improved method of control which comprises; removing a sample stream of said pickling bath, measuring by photometric means the ferrous ion content of said stream and regulating accordingly the addition of water to said bath to maintain said ferrous ion content of said solution at a predetermined concentration, measuring the specific gravity of said stream containing said predetermined concentration of ferrous ion and obtaining a signal which is a measure of the sulfuric acid concentration of said bath, and regulating the addition of concentrated makeup sulfuric acid to said bath in response to said signal to maintain said acid in said bath at a predetermined concentration.

4. In the pickling of a ferrous metal by contact with an aqueous hydrochloric acid pickling bath wherein said acid is consumed by conversion to ferrous chloride and wherein water and concentrated makeup hydrochloric acid are added to said bath, the improved method of control which comprises; removing a sample stream of said pickling bath, measuring by photometric means the ferrous ion content of said stream and regulating the addition of water to said bath to maintain said ferrous ion of said bath at a preternated concentration, measuring the specific gravity of said stream containing said predetermined concentration of ferrous ion and obtaining a signal which is a measure of the hydrochloric acid concentration of said bath, and regulating the addition of concentrated makeup hydrochloric acid to said bath in response to said signal to maintain said acid at a predetermined concentration.

5. In a method of treating a metal by contact with an aqueous acid bath wherein acid is consumed by conversion to an ionized metal salt and wherein water and concentrated makeup acid are added to the bath, the improved method of control which comprises; continuously determining by photometric means the concentration of ions of said metal of the said bath and controllably adding water to said bath to maintain said concentration of ions substantially constant, measuring the specific gravity of said bath to obtain a signal which is a direct measure of the acid concentration of said bath, and regulating the addition of concentrated makeup acid to said bath in response to said signal to maintain the said acid concentration of said bath within predetermined limits.

6. The process of claim 5, wherein the measurements of said concentration of ions and acid are conducted on a sample stream continuously withdrawn from said bath and further comprising separating dissolved gas, including hydrogen, from said sample stream prior to conducting said measurements.

7. The process of claim 5, wherein the measurements of said concentration of ions and acid are conducted on a sample stream continuously withdrawn from said bath and further comprising passing said sample stream through a filter effecting removal of suspended solids and separating dissolved gases, including hydrogen, from said sample stream prior to conducting said measurements.

8. The process of claim 5, wherein the measurements of said concentration of ions and acid are conducted on a sample stream continuously withdrawn from said bath and further comprising passing said sample stream downwardly through a filter zone having a gas disengaging space at its upper end for removing suspended solids and separating dissolved gases, including hydrogen, from said sample stream and venting separated gas from said space, and removing the filtered sample stream from the lower end of said zone prior to conducting said measurements thereon.

9. The process of claim 5, wherein said photometric means is a colorimeter and wherein the measurements of said concentration of ions and acid are conducted on a sample stream continuously withdrawn from said bath and further comprising passing said stream through a filter zone and therein removing suspended solids and dissolved gas from said stream and passing the effluent stream from said filter zone through said colorimeter to photometrically determine the ferrous ion content thereof.

10. The process of claim 9, wherein the effluent stream from said colorimeter is passed through a specific gravity measuring means wherein the measurement of specific gravity of said stream is continuously determined.

11. Apparatus for automatically controlling the addition of water and concentrated makeup acid to an acid pickling bath comprising; means for continuously withdrawing a sample stream from said bath and photometric means which receives said stream and continuously measures the concentration of a metal ion of said stream, valve control means automatically responsive to the continuous measurement of said metal ion concentration of said stream for controlling the addition of water to said bath so as to maintain the said concentration of metal ion substantially constant in said bath, means for continuously measuring the specific gravity of said stream and obtaining a signal which is a direct measure of the acid concentration of said bath, and a second valve control means continuously responsive to said signal for regulating the addition of concentrated makeup acid to said bath to maintain the acid concentration of said bath within predetermined limits.

12. Apparatus for automatically controlling the addition of water and concentrated makeup acid to an acid pickling bath in a pickling tank for ferrous metals comprising; colorimeter means, conduit means for continuously withdrawing a sample stream from said pickling tank and continuously flowing said stream through said colorimeter means for exposure therein to light and means for transmitting from said colorimeter means a first signal which is a measure of the ferrous ion concentration of said pickling bath, valve control means for a water addition conduit responsive to said first signal for controlling the addition of water to said tank to maintain the said ferrous ion concentration of said bath substantially constant, means for continuously measuring the specific gravity of said stream and transmitting a second signal which is a measure of the acid concentration of said bath, and a second valve control means for a makeup acid conduit responsive to said second signal for regulating the addition of concentrated makeup acid to said bath; thereby maintaining the acid concentration of said bath within predetermined limits.

References Cited
UNITED STATES PATENTS

| | | | |
|---|---|---|---|
| 2,158,992 | 5/1939 | Cook | 134—3 XR |
| 2,423,385 | 7/1947 | Hixson et al. | 134—10 |
| 2,765,218 | 10/1956 | Amir | 23—253 XR |
| 2,927,871 | 3/1960 | Mancke et al. | 134—15 XR |
| 2,977,199 | 3/1961 | Quittner | 23—253 XR |
| 3,005,688 | 10/1961 | Williams | 23—253 XR |
| 3,062,223 | 11/1962 | Malin et al. | 134—10 XR |
| 3,074,277 | 1/1963 | Hill | 134—41 XR |

MORRIS O. WOLK, *Primary Examiner.*

J. ZATARGA, *Assistant Examiner.*

U.S. Cl. X.R.

134—15, 18, 41, 57; 73—439; 23—230, 253